(12) United States Patent
Abraham et al.

(10) Patent No.: US 6,385,790 B1
(45) Date of Patent: May 14, 2002

(54) PORTABLE TOILET

(76) Inventors: John Abraham, 11767 NW. 48th St., Coral Springs, FL (US) 33076; Michael M. Anthony, 10189 W. Sample Rd., Coral Springs, FL (US) 33065

( * ) Notice: Subject to any disclaimer, the term of this patent is extended or adjusted under 35 U.S.C. 154(b) by 0 days.

(21) Appl. No.: 09/644,076

(22) Filed: Aug. 23, 2000

(51) Int. Cl.⁷ .............................................. A47K 11/06
(52) U.S. Cl. ................................................ 4/484; 4/479
(58) Field of Search ........................... 4/484, 483, 479, 4/449, 456

(56) References Cited

U.S. PATENT DOCUMENTS

| | | | | |
|---|---|---|---|---|
| 1,663,966 A | * | 3/1928 | Ament et al. ................... | 4/484 |
| 3,400,409 A | | 9/1968 | James ............................... | 4/1 |
| 3,475,767 A | | 11/1969 | Friesen et al. .................. | 4/110 |
| 3,605,127 A | * | 9/1971 | Dailey ............................ | 4/484 |
| 3,628,197 A | * | 12/1971 | Leventhal ....................... | 4/456 |
| 3,643,266 A | | 2/1972 | Black .............................. | 4/142 |
| 3,716,871 A | | 2/1973 | Borse ............................. | 4/110 |
| 3,734,154 A | | 5/1973 | Polk ............................... | 150/9 |
| 3,742,523 A | | 7/1973 | Atkins ............................ | 4/110 |
| 3,772,711 A | | 11/1973 | Spector .......................... | 4/78 |
| 3,992,729 A | | 11/1976 | Mills .............................. | 4/110 |
| 4,312,085 A | | 1/1982 | Potter ............................ | 4/661 |
| 4,343,053 A | | 8/1982 | O'Connor ...................... | 4/452 |
| 4,360,932 A | | 11/1982 | Yoshida ...................... | 4/144.2 |
| 4,509,215 A | | 4/1985 | Paz ................................ | 4/452 |
| 4,734,941 A | | 4/1988 | DeWitt et al. .................. | 4/144 |
| 4,759,086 A | | 7/1988 | Booth-Cox ..................... | 4/451 |
| 4,827,540 A | | 5/1989 | Stokes ............................ | 4/456 |
| 4,937,890 A | | 7/1990 | Tafur ............................. | 4/144 |
| 4,947,493 A | * | 8/1990 | Salonica ......................... | 4/456 |
| 4,974,270 A | | 12/1990 | Kuhn ............................. | 5/90 |
| 4,979,242 A | * | 12/1990 | Maggio ......................... | 4/449 |
| 5,065,459 A | | 11/1991 | Tjahaja et al. .................. | 4/144 |
| 5,117,511 A | | 6/1992 | Smith ............................. | 4/114 |
| 5,129,111 A | * | 7/1992 | Feinzilberg et al. ........... | 4/484 |
| 5,224,223 A | | 7/1993 | Royal ............................. | 4/451 |
| 5,329,644 A | | 7/1994 | Scott .............................. | 4/144 |
| 5,377,364 A | * | 1/1995 | Cabrera .......................... | 4/483 |
| 5,848,443 A | | 12/1998 | Waugh ........................... | 4/458 |
| 6,079,058 A | * | 6/2000 | Green ............................ | 4/484 |

FOREIGN PATENT DOCUMENTS

| | | | | |
|---|---|---|---|---|
| DE | 3965 | * | 7/1878 | ..................... 4/484 |
| DE | 2508054 | * | 9/1976 | ..................... 4/483 |
| GB | 686682 | * | 1/1953 | ..................... 4/484 |
| WO | 91/03199 | * | 3/1991 | ..................... 4/484 |

OTHER PUBLICATIONS

Inflate–a Potty, Safety Central Online, http://store.yahoo.com/safetycentral/inflateapotty.html, no date.*

* cited by examiner

*Primary Examiner*—Charles R. Eloshway
(74) *Attorney, Agent, or Firm*—Oltman, Flynn & Kubler

(57) ABSTRACT

A portable toilet apparatus includes a seat elevating structure; an annular seat structure having an open middle and resting on the seat elevating structure, and including a sack securing mechanism; and a waste collection sack having a closed sack lower end and an open sack upper end removably secured to the annular seat structure with a waste collection sack engagement structure. The seat elevating structure preferably includes an annular bellows having a tubular accordion outer bellows side wall and a tubular accordion inner bellows side wall spaced inwardly from the outer bellows side wall, and an annular upper bellows wall and annular lower bellows wall integrally joined to the inner and outer bellows side walls to define an annular bellows interior space for releasibly trapping air, the upper bellows wall being sized to fit and fitting within the annular seat structure and providing a yielding, resilient cushion effect when the annular seat structure is sat upon. The annular bellows preferably has an expanded mode and has one or more compressed modes, and is molded from resilient material in its expanded mode, so that the resilience of the resilient material biases the bellows to return to its expanded mode after the annular bellows is compressed, the annular bellows additionally including a valve port and a bellows air valve sealingly fitted into the valve port.

14 Claims, 14 Drawing Sheets

PORTABLE TOILET

BACKGROUND OF THE INVENTION

1. Field of the Invention

The present invention relates generally to the field of human waste disposal. More specifically the present invention relates to a portable toilet apparatus including an annular seat structure resting on seat elevating means, a waste collection sack mounting structure secured to and extending below the open middle of the annular seat structure and a waste collection sack having a closed sack lower end removably secured to the sack mounting structure and an open sack upper end removably secured with sack engagement structure at its upper end open edge along the annular seat structure inner circumference.

The seat elevating means preferably includes an annular bellows having a tubular accordion outer bellows side wall and a tubular accordion inner bellows side wall spaced inwardly from the outer bellows side wall, and an annular upper bellows wall and annular lower bellows wall integrally joined to the inner and outer bellows side walls to define an annular bellows interior space for releasibly trapping air. The bellows is sized in diameter so that the annular seat structure fits against and follows the entire annular upper bellows wall, and provides a yielding, resilient cushion effect when sat upon. The bellows is molded in its expanded mode so that its resilience biases the bellows to return to its expanded mode after being compressed. A valve port is provided in the lower bellows wall into which a bellows air valve is sealingly fitted.

The seat structure for this embodiment includes an annular seat channel member opening downwardly, the upper surface of which functions as the seat. The annular bellows upper end fits into the annular seat channel member so that the seat structure remains centered on the bellows. Two connection legs are integrally formed with the seat structure and extend downwardly from diametrically opposed points along the inner edge of the annular seat channel member to fit through the annular open middle of the bellows. One locking slot, or a longitudinally extending series of compression locking slots, is provided in each connection leg beginning near the leg lower end.

An annular bottom channel fits over the annular bellows lower end and includes two upwardly extending engaging arms which are preferably secured to the bottom channel inner circumference at diametrically opposed points. Each of these engaging arms has an inwardly extending engaging tab at its upper end which fits engagingly and removably into one of the locking slots in the corresponding, adjacent connection leg to hold the bellows in a state of full or partial compression such as for storage. A waste collection sack engagement structure removably secures the waste collection sacks to the annular seat structure inner circumference. A second embodiment is provided in which the seat elevating means is a plurality of seat legs, rather than an annular bellows.

2. Description of the Prior Art

There have long been portable toilets for use at construction and camping sites. These toilets have often been little more than large bowls requiring sanitary cleaning after each use, and being of an unyielding, fixed height inconvenient for many users.

Safety Central™, has a website at www.safetycentral.com revealing a product referred to as Inflate-A-Potty #1070 which appears to be a portable toilet having an inflatable toilet bowl with essentially a conventional toilet seat resting on the inflatable bowl.

Booth-Cox, U.S. Pat. No. 4,759,086 issued on Jul. 26, 1988 discloses a disposable receptacle for bodily waste in which a flexible receptacle is fitted into a retaining vessel lined with cushion material.

Black, U.S. Pat. No. 3,643,266, issued on Feb. 22, 1972 teaches a portable waste receptacle including an upright cylindrical container having a removable funnel seated in the upper portion thereof, the funnel having an offset spout and a waste receiving bag fitted within the funnel and projecting through the spout, over a horizontal bar and into the bottom of the container.

Other prior toilet designs include Kuhn, U.S. Pat. No. 4,974,270 issued on Dec. 4, 1990 for a disposable bed pan; Stokes, U.S. Pat. No. 4,827,540, issued on May 9, 1989 for a combination bedpan cushion and waste bag; DeWitt, et al., U.S. Pat. No. 4,734,941, issued on Apr. 5, 1988 for a flushable urine conducting appliance; Paz, U.S. Pat. No. 4,509,215, issued on Apr. 9, 1985 for a disposable liner for a musical potty chair powered by a key wound spring mechanism; Yoshida, U.S. Pat. No. 4,360,932, issued on Nov. 30, 1982 for a urination disposal bag; Smith, U.S. Pat. No. 5,117,511, issued on June 2, 1992 for a liquid disposal automotive accessory; James, U.S. Pat. No. 3,400,409, issued on Sep. 10, 1968 for a disposable toilet kit; Spector, U.S. Pat. No. 3,772,711, issued on Nov. 20, 1973 for toilet with disposable receptacle; Waugh, U.S. Pat. No. 5,848,443, issued on Dec. 15, 1998 for a portable automobile urinal; O'Conner, U.S. Pat. No. 4,343,053, issued on Aug. 10, 1982 for disposable bedpan liner; Polk, U.S. Pat. No. 3,734,154, issued on May 22, 1973 for disposable bag with self-closing valve; Friesen, et al., U.S. Pat. No. 3,475,767, issued on Nov. 4, 1969 for a sanitary disposable receiver for liquid and solid materials, especially human wastes; Borse, U.S. Pat. No. 3,716,871, issued on Feb. 20, 1973 for a disposable urinal; Atkins, U.S. Pat. No. 3,742,523, issued on Jul. 3, 1973 for a disposable urinal; Mills, U.S. Pat. No. 3,992,729, issued on Nov. 23, 1976 for a carrier or support means for disposable bedpans; Potter, U.S. Pat. No. 4,312,085, issued on Jan. 26, 1982 for sanitary waste disposal packets; Royal, U.S. Pat. No. 5,224,223, issued on Jul. 6, 1993 for a disposable bedpan; Tafur, U.S. Pat. No. 4,937,890, issued on Jul. 3, 1990 for a flat folded disposable female urinary aid; Tjahaja, et al., U.S. Pat. No. 5,065,459 issued on Nov. 19, 1991 for a disposable portable urinal; and Scott, U.S. Pat. No. 5,329,644, issued on Jul. 19, 1994 for a disposable urine container.

It is thus an object of the present invention to provide a portable toilet apparatus which can be reduced in overall size for compact storage, suitable for use at construction sites, camping sites and during severe storms which interrupt receipt of running water.

It is another object of the present invention to provide such an apparatus which provides a resilient cushion effect when sat upon and which is adjustable in height to meet the needs of the individual user.

It is still another object of the present invention to provide such an apparatus which includes a bellows which is expanded to its full extent by its resilience rather than by blowing air into the bellows.

It is finally an object of the present invention to provide such an apparatus which is lightweight, durable and inexpensive to manufacture.

SUMMARY OF THE INVENTION

The present invention accomplishes the above-stated objectives, as well as others, as may be determined by a fair reading and interpretation of the entire specification.

A portable toilet apparatus, including a seat elevating structure; an annular seat structure having an open middle and resting on the seat elevating structure, and including a sack securing mechanism; and a waste collection sack having a closed sack lower end and an open sack upper end removably secured to the annular seat structure with a waste collection sack engagement structure.

The seat elevating structure preferably includes an annular bellows having a tubular accordion outer bellows side wall and a tubular accordion inner bellows side wall spaced inwardly from the outer bellows side wall, and an annular upper bellows wall and annular lower bellows wall integrally joined to the inner and outer bellows side walls to define an annular bellows interior space for releasibly trapping air, the upper bellows wall being sized to fit and fitting within the annular seat structure and providing a yielding, resilient cushion effect when the annular seat structure is sat upon. The annular bellows preferably has an expanded mode and has one or more compressed modes, and is molded from resilient material in its expanded mode, so that the resilience of the resilient material biases the bellows to return to its expanded mode after the annular bellows is compressed, the annular bellows additionally including a valve port and a bellows air valve sealingly fitted into the valve port. The seat structure preferably includes an annular seat channel member opening downwardly and having an upper surface, and wherein the annular bellows has an annular bellows upper end fitting into the annular seat channel member so that the seat structure remains centered on the bellows. The annular bellows preferably has a bellows open middle; and the apparatus preferably additionally includes two engaging legs connected to the seat structure and extending downwardly from the annular seat channel member and fitting through the bellows open middle, each engaging leg having at least one compression locking slot. The engaging legs optionally each have a longitudinally extending series of compression locking slots. The apparatus optionally additionally includes a gap in a portion of the channel member to expose an area of the annular bellows.

The apparatus preferably additionally includes a toilet paper roll mounting structure secured to the seat structure. The toilet paper roll mounting structure preferably includes two parallel and spaced apart spindle mounting flanges including spindle end engaging structure; and a telescoping toilet paper retaining spindle releasibly extending between and to opposing the spindle end engaging structure. The annular bellows preferably has a lower end, the apparatus additionally including annular bottom channel fitting over the lower end of the annular bellows and including two upwardly extending engaging arms secured to the bottom channel, each engaging arm having an inner circumferential wall and having an engaging tab for fitting engagingly and removably into one of the compression locking slots, so that the engaging tabs of the engaging arms register with and are fitted into corresponding the locking slots to hold the annular bellows in a compressed mode. The apparatus preferably additionally includes a quantity of scent releasing material within the annular bellows interior space for releasing scent with discharged air when the valve is open and the annular bellows is compressed.

The waste collection sack engagement structure preferably includes an annular sack engaging groove in the seat structure into which the opening edge of the waste collection sack is fitted and wedged into the engaging groove by subsequent insertion of the bottom channel inner circumferential wall into sack engaging groove.

The apparatus preferably still additionally includes a waste collection sack mounting structure secured to and extending below the open middle of the annular seat structure. The waste collection sack mounting structure preferably includes the two engaging legs, where each engaging leg includes a sack spindle engaging structure opening toward the sack spindle engaging structure in the opposing engaging leg; and a spring-loaded, telescoping sack spindle having two sack spindle ends releasibly fitting into the opposing sack spindle engaging structure.

The apparatus preferably includes a roll of waste collection sacks interconnected in series along perforated lines fitted around the sack spindle, so that the outermost sack on the roll of waste collection sacks may be deployed and its opening edge secured along and within the annular sack engaging groove wherein it is wedged into place and thereby removably secured by subsequent insertion of the bottom channel inner circumferential wall into sack engaging groove and wherein the roll of waste collection sacks anchors the given deployed sack lower end relative to the waste collection sack mounting structure.

The seat elevating structure preferably includes several seat legs, each seat leg having a leg upper end and a leg lower end; and a series of seat leg mounting structures joined to the seat structure. The seat leg mounting structures preferably include blocks of seat material and extend downwardly within the seat annular channel, each block having a downwardly opening and generally upright seat leg bore sized to receive a leg upper end, and the seat leg upper ends are sized in diameter to fit snugly and removably into any leg bore. The apparatus preferably additionally includes a floor abutment cap fitted engagingly over each leg lower end.

The apparatus preferably additionally includes an annular seat cover sized to substantially match the size of the annular seat structure and resting on top of the annular seat structure. The apparatus preferably is formed of plastic.

BRIEF DESCRIPTION OF THE DRAWINGS

Various other objects, advantages, and features of the invention will become apparent to those skilled in the art from the following discussion taken in conjunction with the following drawings, in which.

DETAILED DESCRIPTION OF THE PREFERRED EMBODIMENTS

Figure 1:
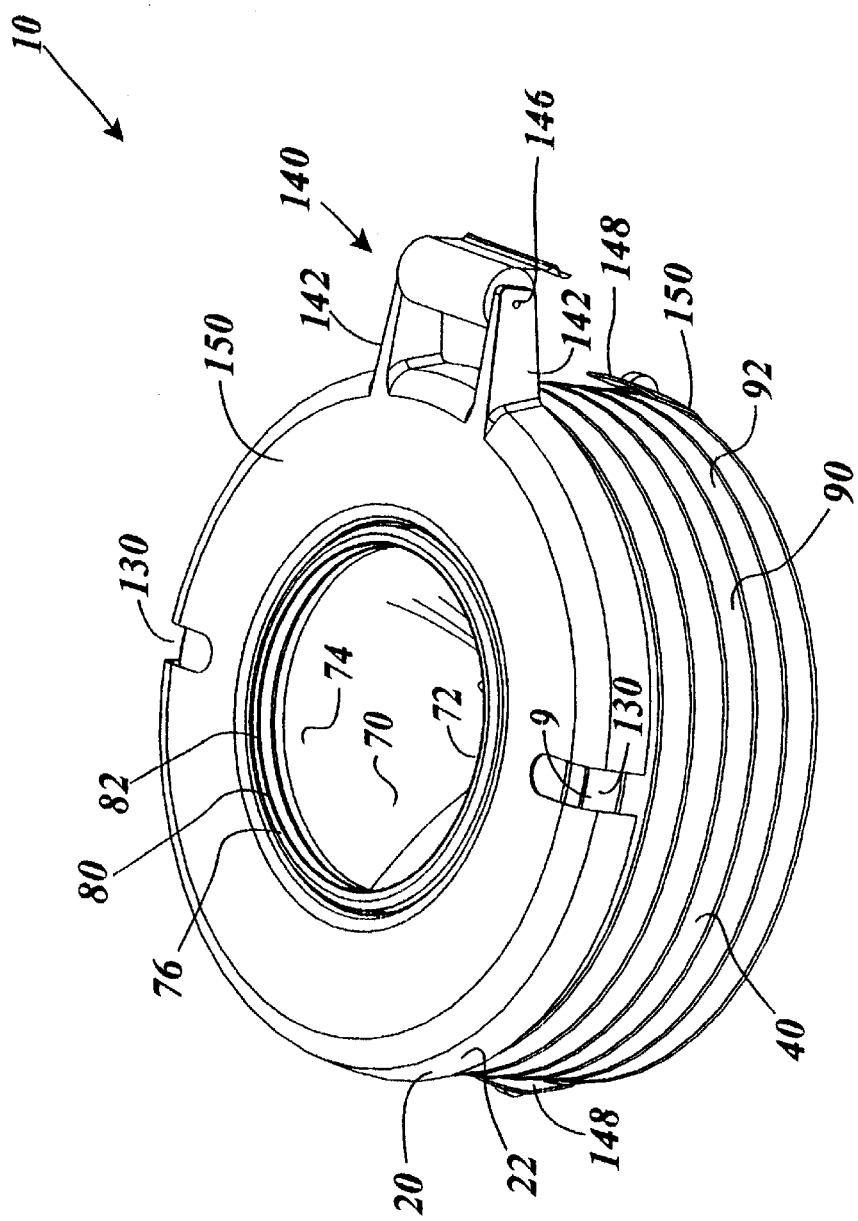
FIG. 1 is an upper perspective view of the toilet apparatus of the first embodiment, deployed and ready for use.
Figure 2:
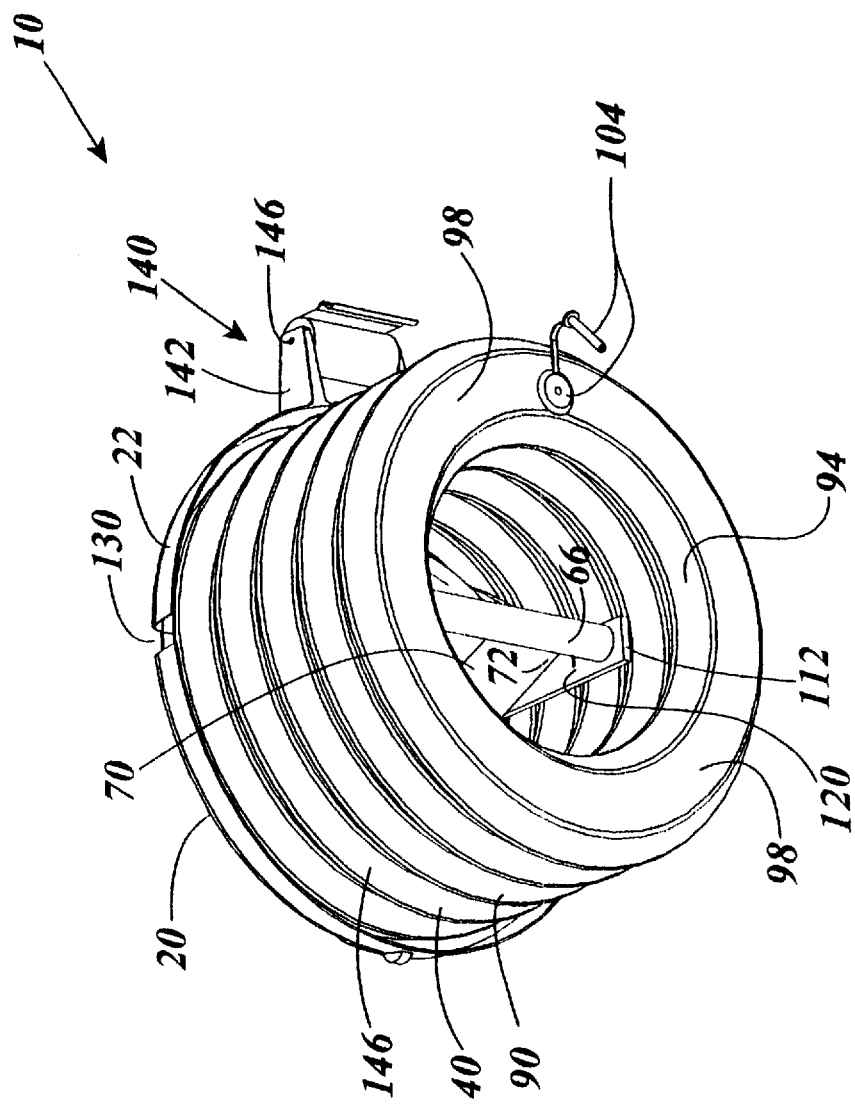
FIG. 2 is a lower perspective view of the apparatus of the first embodiment.
Figure 3:
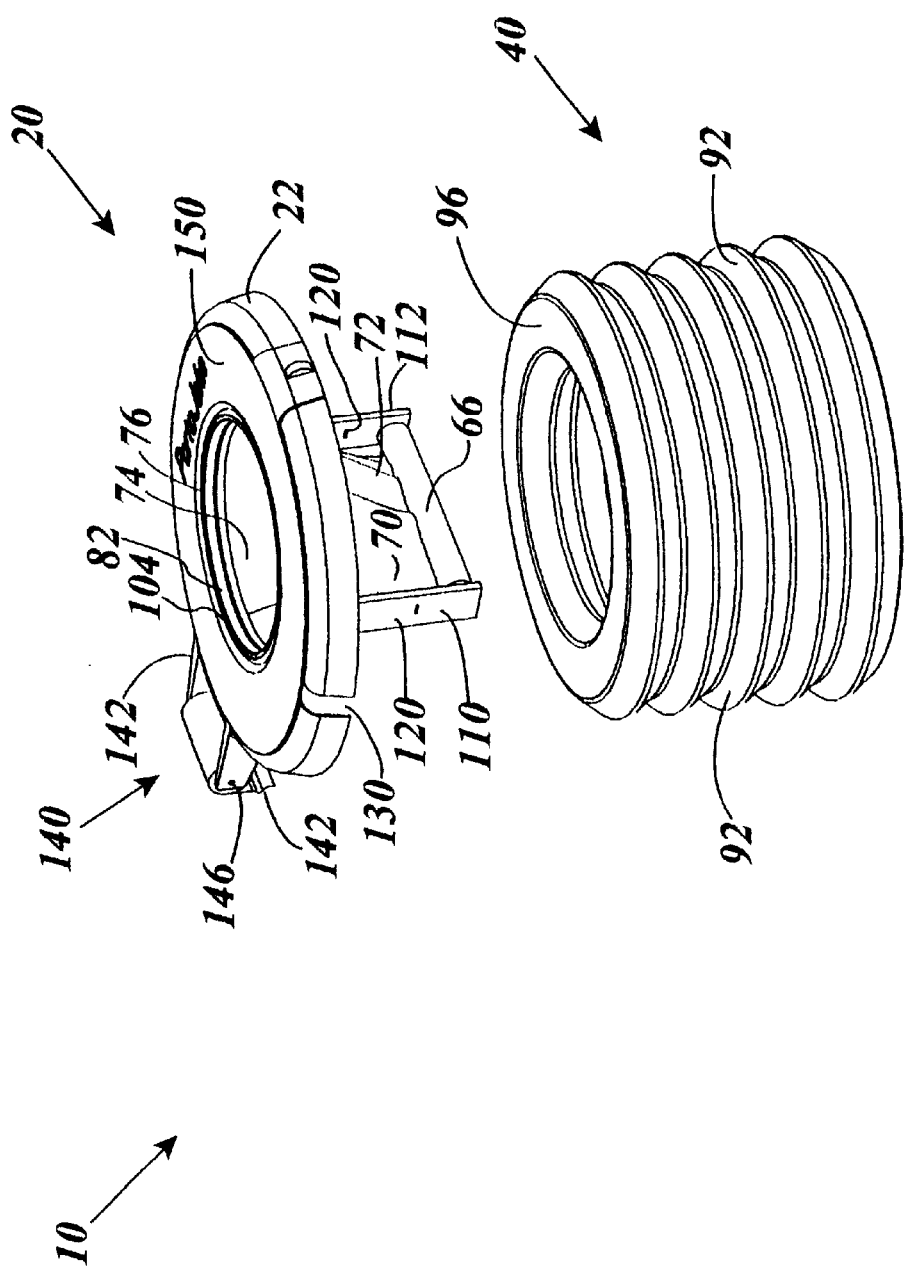
FIG. 3 is a partially exploded view of the apparatus of the first embodiment.
Figure 4:
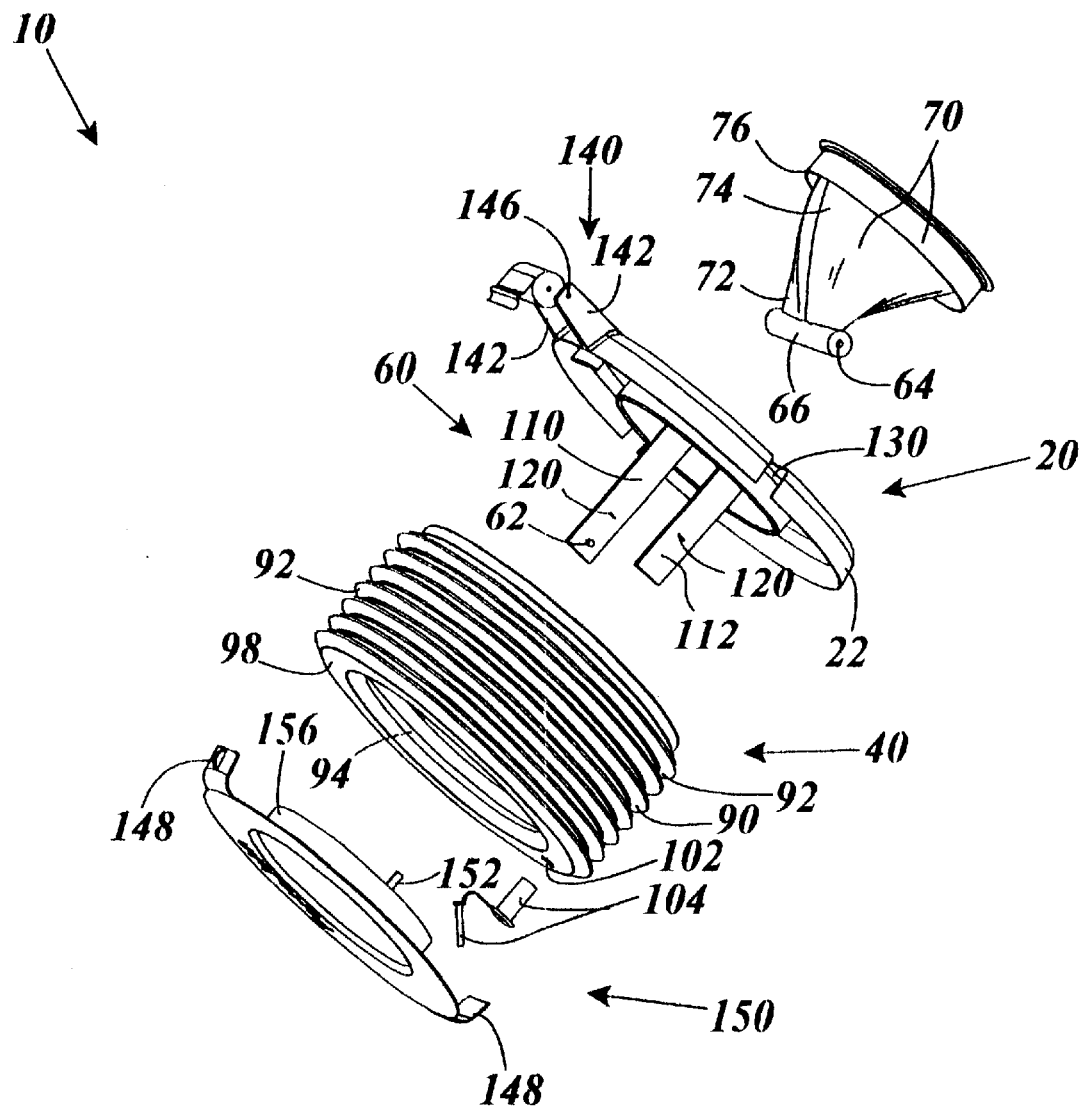
FIG. 4 is a fully exploded perspective view of the apparatus of the first embodiment.
Figure 5:
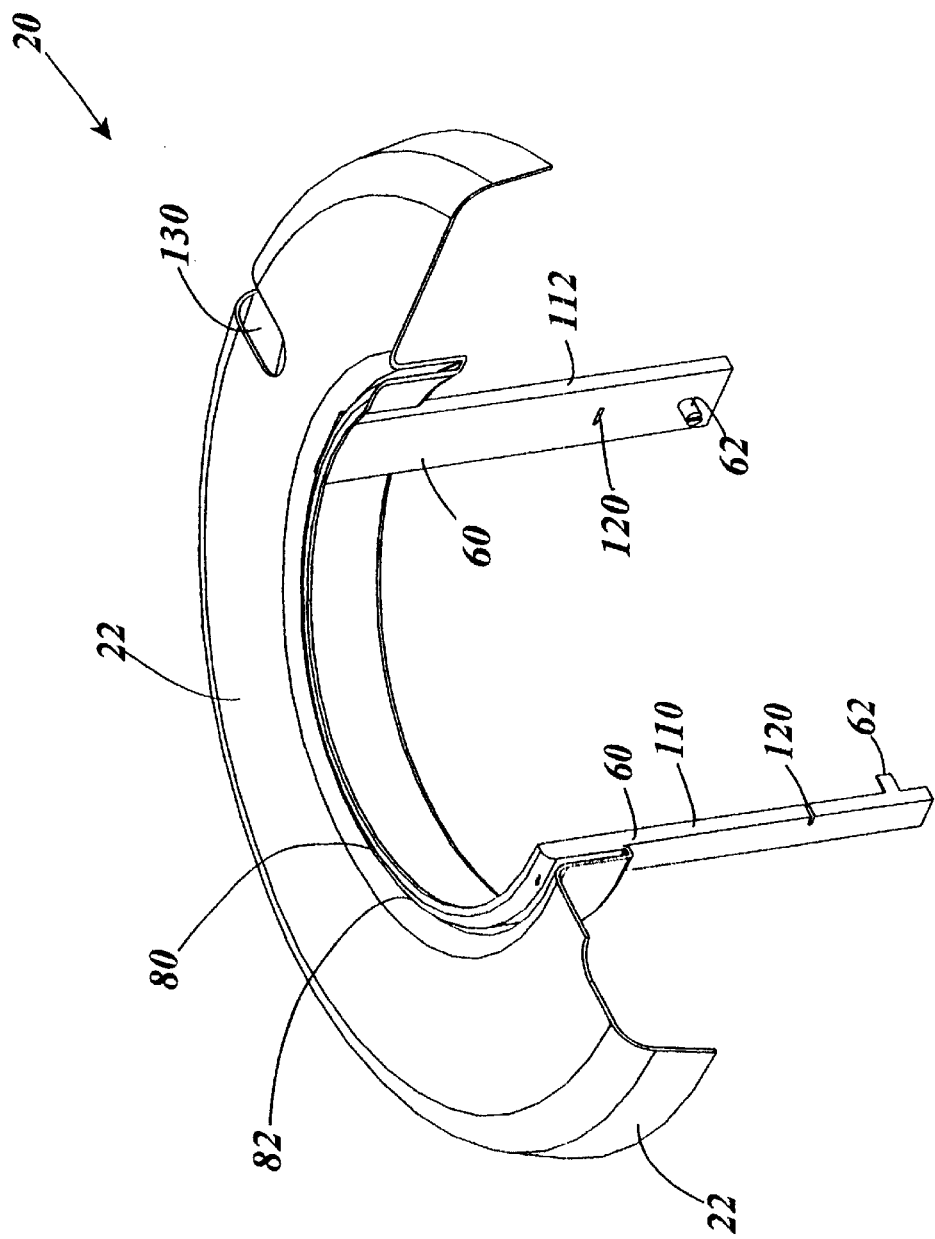
FIG. 5 is an upper perspective view of the seat structure of the first embodiment.
Figure 6:
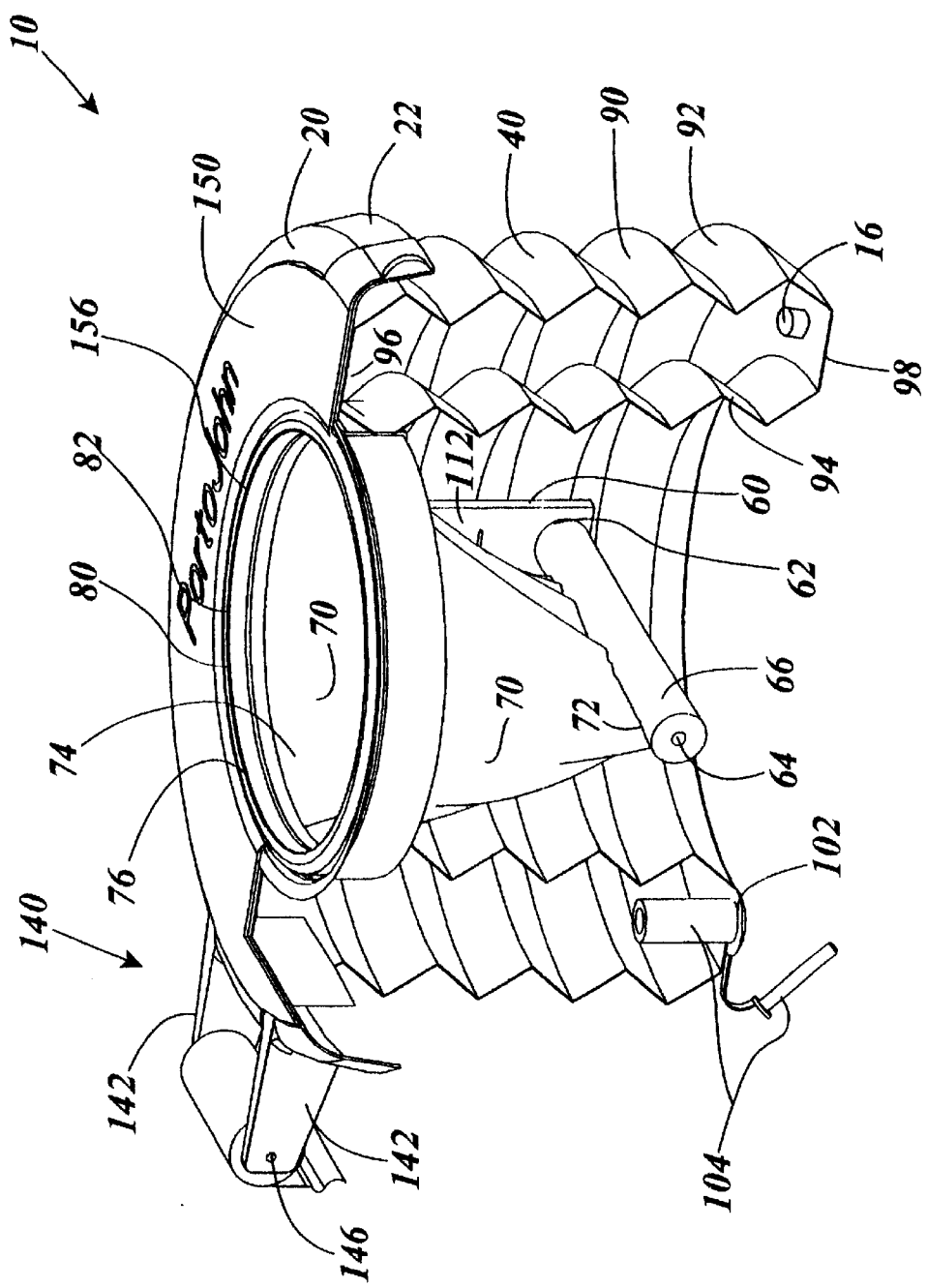
FIG. 6 is a cut-away upper perspective view of the first embodiment, revealing the collection sack mounting structure, mounted roll of collection sacks and scent tablet.
Figure 7:
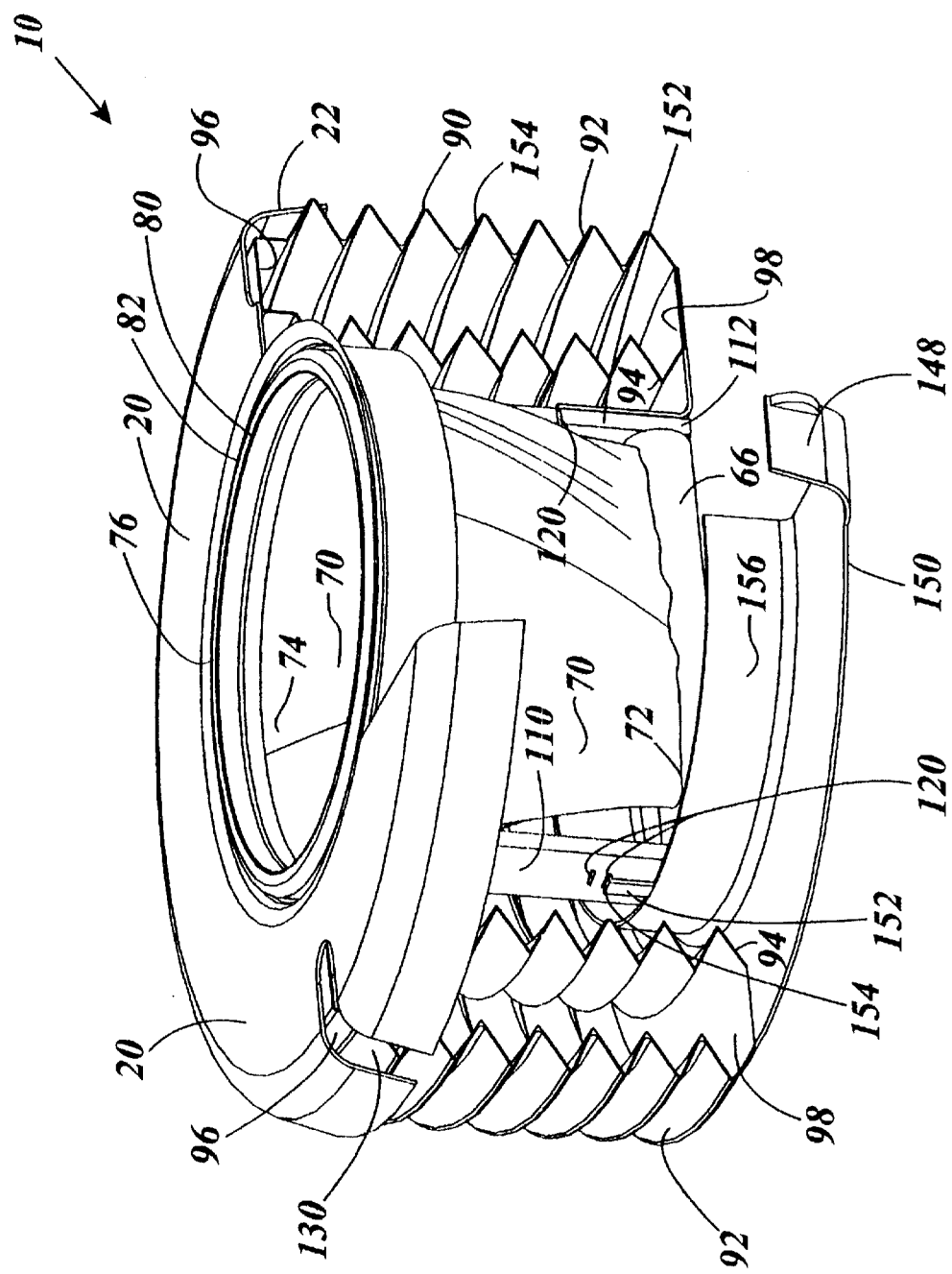
FIG. 7 is another cut-away upper perspective view of the first embodiment, revealing the engaging leg and engaging arm interconnection at a selected compression locking slot.
Figure 8:
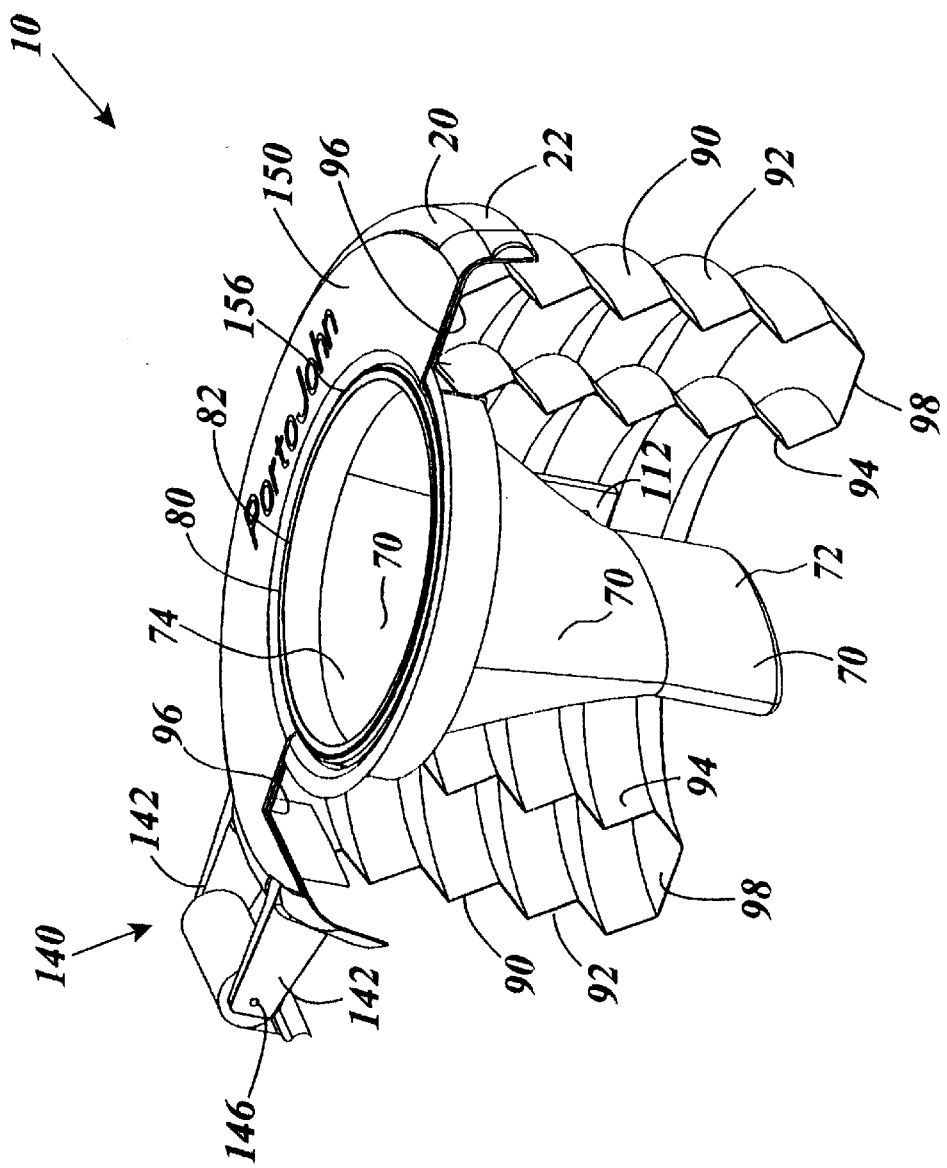
FIG. 8 is a cut-away upper perspective view of a second version of the first embodiment, with means for containing and mounting only one collection sack.
Figure 9:
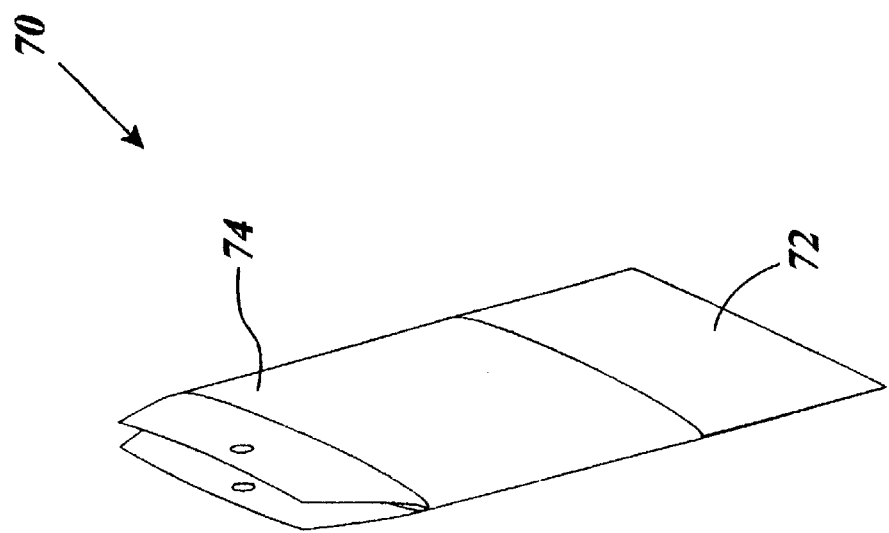
FIG. 9 is a perspective view of one of the preferred waste collection sacks.
Figure 10:
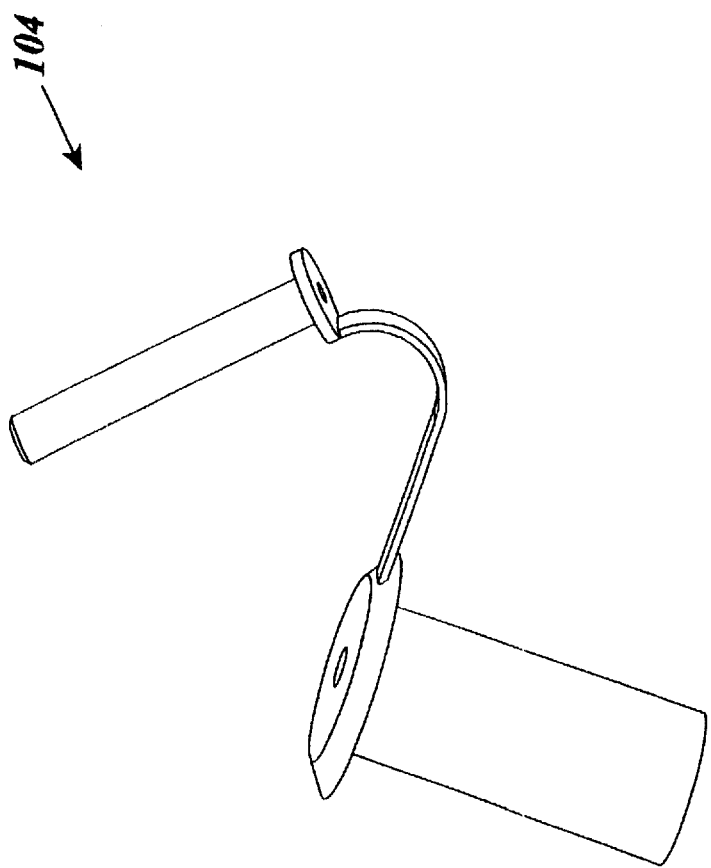
FIG. 10 is a perspective view of the preferred air valve, shown with the valve stopper pulled out of the valve.
Figure 11:
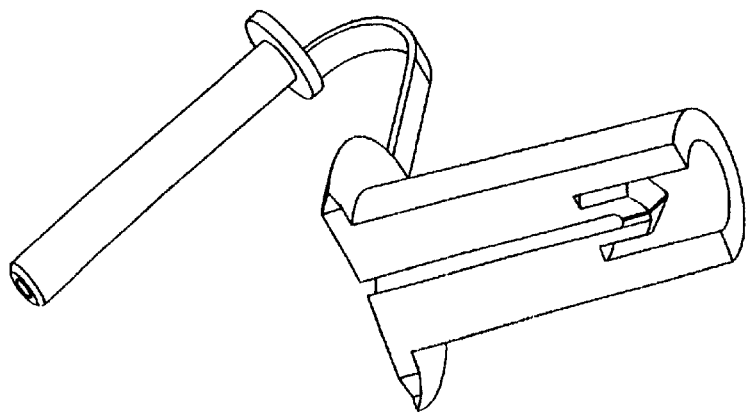
FIG. 11 is a cross-sectional lower perspective view of the preferred air valve, showing the axial stopper passageway with resilient closed passageway closure jaws at the passageway innermost end.
Figure 12:
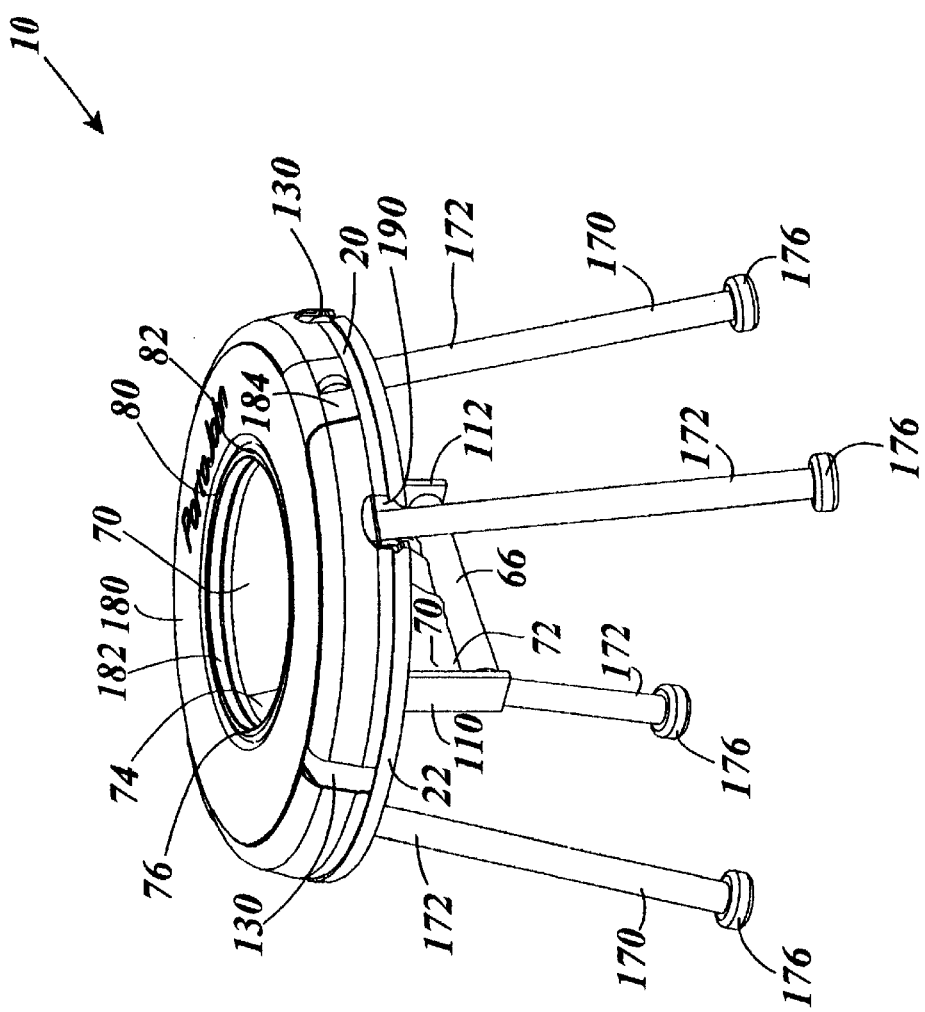
FIG. 12 is a perspective view of the apparatus of the second embodiment in its assembled, deployed form ready for use.

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Reference is now made to the drawings, wherein like characteristics and features of the present invention shown in the various FIGURES are designated by the same reference numerals.

First Preferred Embodiment

Referring to FIGS. 1–12, a portable toilet apparatus 10 is disclosed, including an annular seat structure 20 resting on seat elevating means 40, a waste collection sack mounting structure 60 secured to and extending below the open middle of the annular seat structure 20 and a waste collection sack 70 having a closed sack lower end 72 removably secured to the sack mounting structure 60 and having an open sack upper end 74 with a sack opening edge 76 removably secured with a waste collection sack engagement structure 80 along the annular seat structure 20 inner circumference.

The seat elevating means 40 preferably includes an annular bellows 90 having a tubular accordion outer bellows side wall 92 and a tubular accordion inner bellows side wall 94 spaced inwardly from outer bellows side wall 92, and an annular upper bellows wall 96 and annular lower bellows wall 98 integrally joined to the inner and outer bellows side walls 92 and 94, respectively, to define an annular bellows interior space S for releasibly trapping air. Annular bellows 90 is sized in diameter so that the annular seat structure 20 fits against and follows the entire annular upper bellows wall 96, and bellows 90 provides a yielding, resilient cushion effect when apparatus 10 is sat upon. Annular bellows 90 is molded in its expanded mode so that its resilience biases the bellows 90 to return to its expanded mode after being compressed. A valve port 102 is provided in lower bellows wall 98 into which a bellows air valve 104 is sealingly fitted.

The seat structure 20 for this embodiment includes an annular seat channel member 22 opening downwardly, the upper surface of which functions as the seat. The annular bellows 90 upper end fits into the annular seat channel member 22 so that the seat structure 20 remains centered on bellows 90. Two engaging legs 110 and 112 are integrally formed with the seat structure 20 and extend downwardly from diametrically opposed points along the inner circumference of the annular seat channel member 22 to fit through the open middle of annular bellows 90. One compression locking slot 120, or a longitudinally extending series of compression locking slots 120, is provided at corresponding locations in each engaging leg 110 and 112 beginning near each leg lower end. A gap 130 is preferably provided along the outer side wall portion of the channel member 22 to expose the bellows 90 upper end, so that the user can invert the bellows 90 and pass the stem of valve 104 through gap 130. A toilet paper roll mounting structure 140 in the form of two parallel and spaced apart spindle mounting flanges 142 and a conventional telescoping toilet paper retaining spindle 144 releasibly extends between and into opposing depressions or holes 146 in the two spindle mounting flanges 142. The mounting flanges 142 preferably extend laterally from the side of the annular seat channel member 22.

An annular bottom channel 150, having bottom channel tabs 148 along its periphery, preferably fits over the annular bellows 90 lower end and includes two upwardly extending engaging arms 152 which are preferably secured to the bottom channel 150 inner circumference at diametrically opposed points. Each of these engaging arms 152 has an inwardly extending engaging tab 154 at its upper end which fits engagingly and removably into one of the compression locking slots 120 in the corresponding, adjacent engaging leg 110 or 112. When apparatus 10 is to be stored, it is made more compact by compressing bellows 90 into a flatter configuration. To permit bellows 90 compression, the air valve 104 is opened so that the bellows 90 can expel air. A scent tablet 160 is preferably secured within the bellows interior space S so that fresh scent is dispensed with the air when the bellows 90 is compressed. Then the valve 104 is closed, and the engaging tabs 154 of the engaging arms 152 register with and are fitted into corresponding locking slots 120 to hold the bellows 90 in its compressed mode. And the bellows 90 is also held in a compressed mode by closure of valve 104. The annular bottom channel 150 has an outer side wall which is optionally discontinuous along the annular bottom channel 150 circumference.

Waste collection sack engagement structure 80 removably secures the waste collection sacks 70 to the annular seat structure 20 inner circumference. The waste collection sack engagement structure 80 preferably includes an annular sack engaging groove 82 in the top surface of the seat structure 20 into which the opening edge 76 of the sack 70 is fitted. Annular bottom channel 150 is preferably removed from the bellows 90 lower end and inverted and placed on top of seat structure 20. The inner annular circumferential wall 156 of bottom channel 150 fits snugly into groove 82, on top of and wedging sack opening edge 76 to releasibly hold the sack opening edge 76 within sack engaging groove 82. In this way bottom channel 150 becomes the seat upper surface upon which the user rests.

The two engaging legs 110 and 112 have a second function, in that they form part of the waste collection sack mounting structure 60. For the first version of the preferred embodiment, each leg 110 and 112 includes a spindle engaging means in the form of a sack spindle depression 62 opening toward the sack spindle depression 62 in the opposing engaging leg 110 and 112. A spring-loaded, telescoping sack spindle 64, having the structure of a conventional toilet paper roll spindle, is provided with two spindle ends which releasibly fit into the opposing sack spindle depressions 62. A roll 66 of waste collection sacks interconnected in series along perforated lines is fitted around the sack spindle 64, so that the outermost sack 70 on the roll 66 can be deployed and its opening edge 76 secured along and within the annular sack engaging groove 82. The perforated line interconnection along the sack 70 lower end anchors the sack 70 lower end relative to the collection sack mounting structure 60. Once the deployed sack 70 has been filled to its desired level of fullness, the sack opening edge 76 is disengaged from sack engaging groove 82 and tied closed, and the lower end of the sack 70 is torn off the roll 66 along the perforated line. Examples of exact structures:of rolled series of sacks and sheet products are well known in various fields of art and so will not be restated here.

For a second version of the first embodiment, rather than providing a sack roll 66, only one waste collection sack 70 is secured within the apparatus 10 at a time. For this second version, no waste collection sack mounting structure 60 is provided within the bellows 90. The waste collection sack opening edge 76 is secured within the sack engaging groove 82 in the top surface of the seat structure 20, as described above, and the sack 70 simply hangs from the secured sack opening edge 76. When the sack 70 is filled, it is removed from the sack engaging groove 82 and tied closed, and a fresh sack 70 retrieved from a location separate from apparatus 10 is mounted in the sack engaging groove 82.

Second Preferred Embodiment

Figure 13:
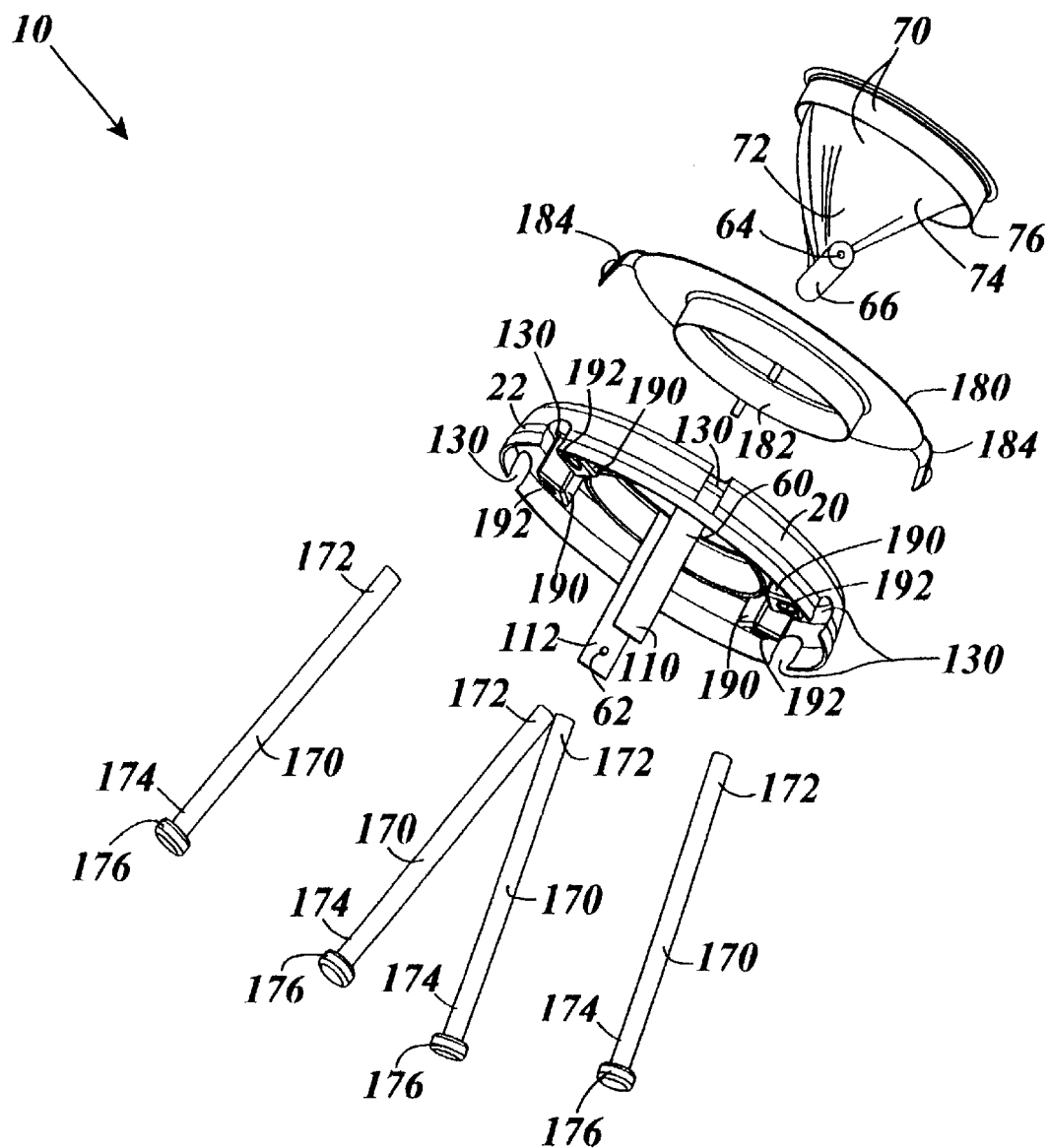
FIG. 13 is an exploded perspective view of the apparatus of the second embodiment.
Figure 14:
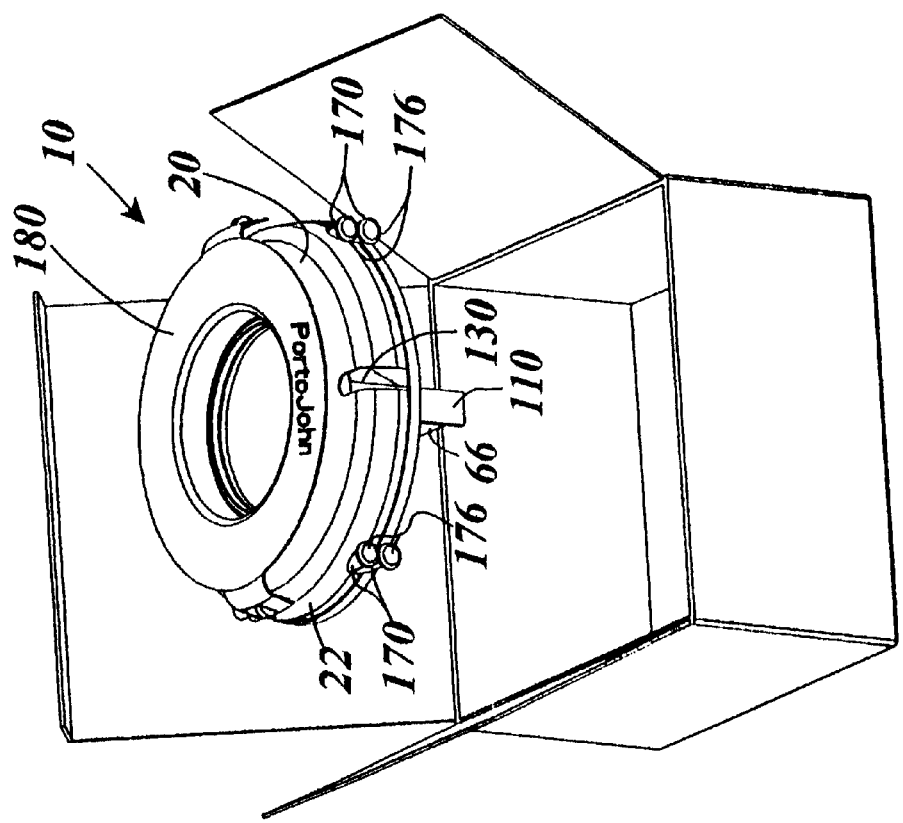
FIG. 14 is an upper perspective view of the apparatus of the second embodiment disassembled for storage and poised for insertion into a storage box.

A second embodiment is provided in which the seat elevating means 40 is a plurality of seat legs 170, rather than an annular bellows. See FIGS. 12–14. An annular seat cover 180 is provided and sized in inner and outer diameters to substantially match the size of the annular seat structure and rests on top of annular seat structure 20. The seat cover 180 has a downwardly directed annular wall 182 along its inner diameter which fits closely inside the central opening of the annular seat structure 20, and outer cover tabs 184 preferably extend radially from the cover 180 outer edge and down around the outside of the seat structure 20. For this embodiment, a series of preferably four seat leg mounting structures are provided in the form of blocks 190 of seat material integrally molded with the seat structure 20 and extending downwardly within the seat annular seat channel member 22. Each block 190 has a downwardly opening and generally upright seat leg bore 192 for releasibly receiving an upper end of a seat leg 170. Four seat legs 170 are provided in the form of elongate members having seat leg upper ends 172 sized to fit snugly into each of the seat leg bores 192 and floor abutment caps 176 fitted engagingly over seat leg lower ends 174. Rather than compressing a bellows to ready the apparatus for compact storage, the legs 170 are pulled out of their seat leg bores 192 and placed together with the seat Either the roll 66 of sacks version or the single sack 70 version of the waste collection sack mounting structure 60 described for the first embodiment is also preferably part of the seat structure 20 for this embodiment. Both embodiments of toilet apparatus 10 are preferably formed of a hard plastic, although construction from many other materials is contemplated.

While the invention has been described, disclosed, illustrated and shown in various terms or certain embodiments or modifications which it has assumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A portable toilet apparatus, comprising:
   seat elevating means;
   an annular seat structure having an open middle and resting on said seat elevating means, and comprising sack securing means;
   and a waste collection sack having a closed sack lower end and an open sack upper end removably secured to said annular seat structure with a waste collection sack engagement structure;
   wherein said seat elevating means comprises an annular bellows having a tubular accordion outer bellows side wall and a tubular accordion inner bellows side wall spaced inwardly from said outer bellows side wall, and an annular upper bellows wall and annular lower bellows wall sealingly joined to the inner and outer bellows side walls to define an annular bellows interior space for releasibly trapping air, said annular bellows providing a yielding, resilient cushion effect when said annular seat structure is sat upon;
   wherein said annular bellows has an expanded mode and compressed modes, and is formed from resilient material such that the resilience of the resilient material biases the bellows to return to its expanded mode after said annular bellows is compressed, said annular bellows additionally comprising a valve port and a bellows air valve sealingly fitted into said valve port.

2. The apparatus of claim 1, wherein said seat structure comprises an annular seat channel member opening downwardly and having an upper surface, and wherein said annular bellows has an annular bellows upper end fitting into said annular seat channel member such that said seat structure remains centered on said annular bellows.

3. The apparatus of claim 1, additionally comprising a toilet paper roll mounting structure secured to said seat structure.

4. The apparatus of claim 3, wherein said toilet paper roll mounting structure comprises:
   two parallel and spaced apart spindle mounting flanges including spindle end engaging means;
   and a telescoping toilet paper retaining spindle releasibly extending between and to opposing said spindle end engaging means.

5. The apparatus of claim 1, additionally comprising a quantity of scent releasing material within said annular bellows interior space for releasing scent with discharged air when said valve is open and said annular bellows is compressed.

6. The apparatus of claim 1, wherein said apparatus is formed of plastic.

7. A portable toilet apparatus, comprising:
   seat elevating means;
   an annular seat structure having an open middle and resting on said seat elevating means, and comprising sack securing means;
   and a waste collection sack having a closed sack lower end and an open sack upper end removably secured to said annular seat structure with a waste collection sack engagement structure;
   wherein said seat elevating means comprises an annular bellows having a tubular accordion outer bellows side wall and a tubular accordion inner bellows side wall spaced inwardly from said outer bellows side wall, and an annular upper bellows wall and annular lower bellows wall sealingly joined to the inner and outer bellows side walls to define an annular bellows interior space for releasibly trapping air, said annular bellows providing a yielding, resilient cushion effect when said annular seat structure is sat upon;
   wherein said seat structure comprises an annular seat channel member opening downwardly and having an upper surface, and wherein said annular bellows has an annular bellows upper end fitting into said annular seat channel member such that said seat structure remains centered on said annular bellows;

wherein said annular bellows has a bellows open middle; the apparatus additionally comprising two engaging legs connected to said seat structure and extending downwardly from said annular seat channel member and fitting through said bellows open middle, each said engaging leg having at least one compression locking means.

8. The apparatus of claim 7, wherein said compression locking means comprises a compression locking slot.

9. The apparatus of claim 8, wherein said waste collection sack engagement structure comprises an annular sack engaging groove in said seat structure into which the opening edge of said waste collection sack is fitted and wedged into said engaging groove by subsequent insertion of the bottom channel inner circumferential wall into said annular sack engaging groove.

10. The apparatus of claim 9, additionally comprising a waste collection sack mounting structure secured to and extending below the open middle of said annular seat structure.

11. The apparatus of claim 10, wherein said waste collection sack mounting structure comprises:

said two engaging legs, wherein each said engaging leg comprises a sack spindle engaging means opening toward the sack spindle engaging means in the opposing said engaging leg; and a spring-loaded, telescoping sack spindle having two sack spindle ends releasibly fitting into said opposing sack spindle engaging means.

12. The apparatus of claim 11, comprising a roll of waste collection sacks interconnected in series along perforated lines fitted around said sack spindle, such that the outermost sack on said roll of waste collection sacks may be deployed and its opening edge secured along and within said annular sack engaging groove wherein it is wedged into place and thereby removably secured by subsequent insertion of the bottom channel inner circumferential wall into sack engaging groove and wherein the roll of waste collection sacks anchors the given deployed sack lower end relative to said waste collection sack mounting structure.

13. The apparatus of claim 7, additionally comprising a gap in a portion of said channel member to expose an area of said annular bellows.

14. The apparatus of claim 7, wherein said annular bellows has a lower end, said apparatus additionally comprising an annular bottom channel fitting over the lower end of said annular bellows and comprising two upwardly extending engaging arms secured to said bottom channel, each said engaging arm having an inner circumferential wall and having an engaging tab for fitting engagingly and removably into one of said compression locking slots, such that said engaging tabs of said engaging arms register with and are fitted into corresponding said locking slots to hold said annular bellows in a compressed mode.

\* \* \* \* \*